US009143507B2

(12) United States Patent
Choi et al.

(10) Patent No.: US 9,143,507 B2
(45) Date of Patent: *Sep. 22, 2015

(54) METHOD, APPARATUS, AND SYSTEM FOR PRE-AUTHENTICATION AND PROCESSING OF DATA STREAMS

(75) Inventors: Hoon Choi, Mountain View, CA (US); Gyudong Kim, Sunnyvale, CA (US); Ook Kim, Palo Alto, CA (US); James D. Lyle, Santa Clara, CA (US); Alexander Peysakhovich, San Jose, CA (US); Michael Schumacher, San Jose, CA (US); Daeyun Shim, Saratoga, CA (US)

(73) Assignee: LATTICE SEMICONDUCTOR CORPORATION, Portland, OR (US)

( * ) Notice: Subject to any disclaimer, the term of this patent is extended or adjusted under 35 U.S.C. 154(b) by 624 days.

This patent is subject to a terminal disclaimer.

(21) Appl. No.: 12/392,000

(22) Filed: Feb. 24, 2009
(Under 37 CFR 1.47)

(65) Prior Publication Data

US 2009/0222905 A1 Sep. 3, 2009

Related U.S. Application Data

(60) Provisional application No. 61/032,424, filed on Feb. 28, 2008.

(51) Int. Cl.
*H04L 29/06* (2006.01)
(52) U.S. Cl.
CPC .................................. *H04L 63/0876* (2013.01)
(58) Field of Classification Search
None
See application file for complete search history.

(56) References Cited

U.S. PATENT DOCUMENTS

| 5,644,731 | A  | * | 7/1997  | Liencres et al. ............... 710/302 |
| 6,009,535 | A  | * | 12/1999 | Halligan et al. ............... 714/5.1 |
| 6,412,025 | B1 | * | 6/2002  | Cheston et al. .................... 710/8 |
| 6,421,711 | B1 | * | 7/2002  | Blumenau et al. ............ 709/213 |
| 6,914,367 | B2 |   | 7/2005  | Furukawa |
| 6,914,637 | B1 |   | 7/2005  | Wolf |
| 6,988,130 | B2 | * | 1/2006  | Blumenau et al. ............ 709/213 |

(Continued)

FOREIGN PATENT DOCUMENTS

| CN | 1636342   | 7/2005 |
| CN | 1636342 A | 7/2005 |

(Continued)

OTHER PUBLICATIONS

White, Ron. "How Computers Work", Millenium Edition. Que Corporation. Sep. 1999.*

(Continued)

*Primary Examiner* — Benjamin Lanier
(74) *Attorney, Agent, or Firm* — Fenwick & West LLP

(57) ABSTRACT

A method, apparatus and system for pre-authenticating ports is disclosed. In one embodiment, an active port facilitating communication of media content between a transmitting device and a receiving device is identified, while the active port are associated with a first High-Definition Content Protection (HDCP) engine. Then, inactive ports that are in idle mode serving as backup ports to the active port are identified, while the inactive ports are associated with a second HDCP engine. Pre-authentication of each of the inactive ports is performed so the pre-authenticated inactive ports can subsequently replace the active port if a port switch is performed.

20 Claims, 12 Drawing Sheets

(56) References Cited

U.S. PATENT DOCUMENTS

| | | | |
|---|---|---|---|
| 7,051,182 B2 * | 5/2006 | Blumenau et al. | 711/202 |
| 7,174,458 B2 * | 2/2007 | Araki et al. | 713/168 |
| 7,283,566 B2 * | 10/2007 | Siemens et al. | 370/486 |
| 7,359,511 B2 * | 4/2008 | Matsuzaki et al. | 380/212 |
| 7,398,547 B2 * | 7/2008 | deCarmo | 726/3 |
| 7,412,053 B1 * | 8/2008 | Lyle | 380/2 |
| 7,710,978 B2 | 5/2010 | Signaoff | |
| 7,797,536 B1 * | 9/2010 | Lyle | 713/168 |
| 7,844,762 B2 | 11/2010 | Banks | |
| 7,945,708 B2 * | 5/2011 | Ohkita | 710/14 |
| 8,374,346 B2 * | 2/2013 | Choi et al. | 380/201 |
| 2002/0130787 A1 * | 9/2002 | James, Jr. et al. | 340/825 |
| 2003/0025685 A1 * | 2/2003 | Shirasaki et al. | 345/204 |
| 2003/0086503 A1 | 5/2003 | Rennert | |
| 2003/0120915 A1 * | 6/2003 | Kleinsteiber et al. | 713/153 |
| 2003/0214507 A1 * | 11/2003 | Mawatari et al. | 345/530 |
| 2004/0123119 A1 * | 6/2004 | Buer et al. | 713/189 |
| 2004/0158873 A1 | 8/2004 | Pasqualino | |
| 2004/0199834 A1 * | 10/2004 | Fukae | 714/699 |
| 2005/0220017 A1 * | 10/2005 | Brand et al. | 370/230.1 |
| 2005/0225547 A1 | 10/2005 | Choi | |
| 2006/0104392 A1 | 5/2006 | Chung | |
| 2006/0161968 A1 | 7/2006 | Crombie | |
| 2006/0208929 A1 | 9/2006 | Cho | |
| 2006/0269056 A1 * | 11/2006 | Montag | 380/205 |
| 2007/0150756 A1 | 6/2007 | Kudelski | |
| 2007/0177786 A1 | 8/2007 | Bartels | |
| 2007/0200859 A1 | 8/2007 | Banks | |
| 2007/0242696 A1 | 10/2007 | Signaoff et al. | |
| 2007/0291938 A1 | 12/2007 | Rao et al. | |
| 2008/0005310 A1 * | 1/2008 | Xu et al. | 709/224 |
| 2008/0013725 A1 * | 1/2008 | Kobayashi | 380/203 |
| 2008/0025507 A1 | 1/2008 | Taylor | |
| 2008/0101467 A1 | 5/2008 | MacMullan | |
| 2008/0159532 A1 * | 7/2008 | Verma | 380/210 |
| 2008/0165289 A1 * | 7/2008 | Furutani | 348/725 |
| 2008/0186403 A1 * | 8/2008 | Douillet | 348/461 |
| 2008/0219174 A1 * | 9/2008 | Ribeiro | 370/242 |
| 2008/0307496 A1 * | 12/2008 | Kurose | 726/2 |
| 2009/0162032 A1 | 6/2009 | Patel | |
| 2010/0005289 A1 * | 1/2010 | Devanand et al. | 713/155 |
| 2010/0177786 A1 | 7/2010 | Signaoff | |
| 2011/0321155 A1 | 12/2011 | Saitoh et al. | |

FOREIGN PATENT DOCUMENTS

| | | |
|---|---|---|
| EP | 1432192 | 6/2004 |
| EP | 1624669 | 2/2006 |
| EP | 1761053 | 3/2007 |
| JP | 2000-048480 A | 2/2000 |
| JP | 2003-37591 A | 2/2003 |
| JP | 2004-523187 A | 7/2004 |
| JP | 2004-336178 A | 11/2004 |
| JP | 2005-508592 A | 3/2005 |
| JP | 2005-514873 A | 5/2005 |
| JP | 2006-128971 A | 5/2006 |
| JP | 2007-228606 A | 9/2007 |
| JP | 2008-306232 A | 12/2008 |
| KR | 10-0662459 B1 | 12/2006 |
| KR | 10-2004-0075031 A | 3/2007 |
| WO | WO 2008/072695 A1 | 6/2008 |

OTHER PUBLICATIONS

"ISR WO Mailed Apr. 23, 2009 for PCT/US2009/*035352", (Apr. 23, 2009), Whole Document.

"ISR WO Mailed Apr. 23, 2009 for PCT/US2009/035353", (Apr. 23, 2009), Whole Document.

Communication pursuant to Article 94(3) EPC for European Patent Application No. 09714794.6-2202, Mailed Jul. 27, 2011, 4 pages.

"Communication Under Rule 71(3) EPC," European App No. 09714761.5-2202, mailing date May 14, 2011, 5 pages.

"High-bandwidth Digital Content Protection System", Digital Content Protection LLC, Revision 1.3, Dec. 21, 2006, 90 pages.

"High-Definition Multimedia Interface", Specification Version 1.1, HItachi Ltd., et al. May 20, 2004. HDMI Licensing,, 206 Pgs.

"First Office Action Issued for Chinese Patent Application No. 200980107103.5," Mailed Mar. 26, 2012, Received from Foreign Associate May 4, 2012. 7 pages.

"Second Office Action Issued for Chinese Patent Application No. 200980107103.5," mailed Nov. 27, 2012, Received from Foreign Associate Dec. 11, 2012. 6 pages.

Chinese First Office Action, Chinese Application No. 200980107104.X, Apr. 13, 2012, 9 pages.

Chinese First Office Action, Chinese Application No. 200980107103.5, Mar. 26, 2012, 12 pages.

Chinese Second Office Action, Chinese Application No. 200980107103.5, Nov. 27, 2012, 6 pages.

Chinese Third Office Action, Chinese Application No. 200980107103.5, May 31, 2013, 12 pages.

Chinese Fourth Office Action, Chinese Application No. 200980107103.5, Dec. 17, 2013, 8 pages.

European Examination Report, European Application No. 09714794.6, Jul. 27, 2011, 4 pages.

European Summons to Attend Oral Proceedings Pursuant to Rule 115(1) EPC, European Application No. 09714794.6, Dec. 29, 2011, 4 pages.

European Result of Consultation, European Application No. 09714794.6, Apr. 2, 2012, 27 pages.

Japanese Office Action, Japanese Application No. 2010-548881, Jun. 12, 2013, 7 pages.

Japanese First Office Action, Japanese Application No. 2010-548882, May 29, 2013, 7 pages.

Japanese Second Office Action, Japanese Application No. 2010-548882, Feb. 10, 2014, 6 pages.

Taiwan Office Action, Taiwan Application No. 098106699, Nov. 21, 2013, 10 pages.

Taiwan Office Action, Taiwan Application No. 098106702, Apr. 27, 2012, 7 pages.

Japanese Office Action, Japanese Application No. 2013-230239, Sep. 9, 2014, 3 pages (with English summary).

Japanese Office Action, Japanese Application No. 2013-230239, Feb. 3, 2015, 3 pages (with English summary).

* cited by examiner

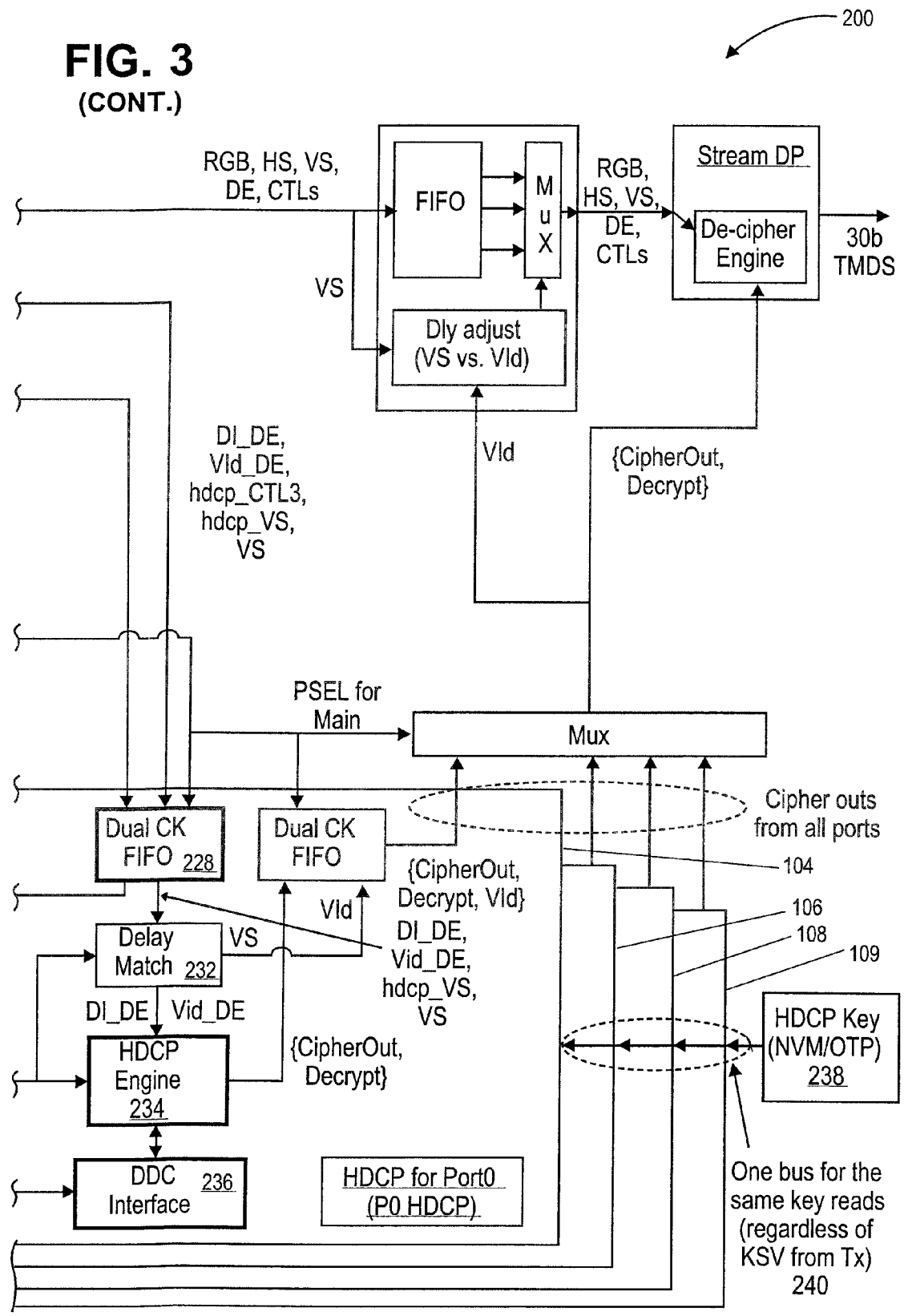

METHOD, APPARATUS, AND SYSTEM FOR PRE-AUTHENTICATION AND PROCESSING OF DATA STREAMS

RELATED APPLICATION

This patent application claims priority to a provisional U.S. patent application No. 61/032,424, filed Feb. 28, 2008.

FIELD

Embodiments of the invention generally relate to the field of networks and, more particularly, to pre-authentication of media content ports.

BACKGROUND

In the operation of a system that utilizes multiple data streams, such as multiple media data streams for display. The data may include data protected by High-bandwidth Digital Content Protection (HDCP) data, which is referred to herein as HDCP data. Thus, a system may result multiple encoded streams that require deciphering. However, the process of deciphering HDCP can be time consuming. This generally results in a delay before the data may be viewed or heard, thereby interfering with the use and enjoyment of a system.

HDCP is a content protection protocol that is used to protect media content, particularly premium media content. For example, when there is flow of content between transmitting device (e.g., a DVD player) and a receiving device (e.g., a television) via the High-Definition Multimedia Interface (HDMI) interface, the premium media content flowing is to be protected, such as the receiving device is validated and authenticated before receiving such media content from the transmitting device, while the transmitting device is validated and authenticated before the receiving the device accepts its content. This validation and authentication of the two devices is performed by exchanging some initial verification data (e.g., public/private keys), which may last less than a second or two.

Each time there is change in the connection, such as the change in connection ports, media content, etc, a new validation/authentication process is run. For example, if the receiving device is now connected to another transmitting device (e.g., digital camera), these two devices are now validated and authenticated before the protected media content can be communicated between them. This process is cumbersome and time-consuming and wastes valuable resources.

Additionally, HDCP receivers are purely slave devices and there is not a way for a receiver to explicitly signal the transmitter with any request or status. For example, even a "broken" link can only be signaled implicitly by intentionally "breaking" the Ri sequence. Although there are various types of HDCP transmitters, many of them exhibit unsuitable behavior that is the primary cause of much of the delay.

It is, therefore, desirable to have the ports pre-authenticated so that the necessity to run an authentication process each time a port is swapped with another port is eliminated.

SUMMARY

A method, apparatus, and system for pre-authentication of media content ports is disclosed.

In one embodiment, a method for pre-authenticating of ports includes identifying an active port facilitating communication of media content between a transmitting device and a receiving device, the active port associated with a first High-Definition Content Protection (HDCP) engine, identifying inactive ports in idle mode serving as backup ports to the active port, the inactive ports associated with a second HDCP engine, and pre-authenticating each of the inactive ports to subsequently replace the active port if a port switch is performed.

In one embodiment, an apparatus includes a pre-authentication device that includes a pre-authentication mechanism to identify an active port facilitating communication of media content between and transmitting device and a receiving device, the active port associated with a first High-Definition Content Protection (HDCP) engine, identify inactive ports in idle mode serving as backup ports to the active port, the inactive ports associated with a second HDCP engine, and pre-authenticate each of the inactive ports to subsequently replace the active port if a port switch is performed.

In one embodiment, a system including a pre-authenticating device to identify an active port facilitating communication of media content between and transmitting device and a receiving device, the active port associated with a first High-Definition Content Protection (HDCP) engine, identify inactive ports in idle mode serving as backup ports to the active port, the inactive ports associated with a second HDCP engine, and pre-authenticate each of the inactive ports to subsequently replace the active port if a port switch is performed.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
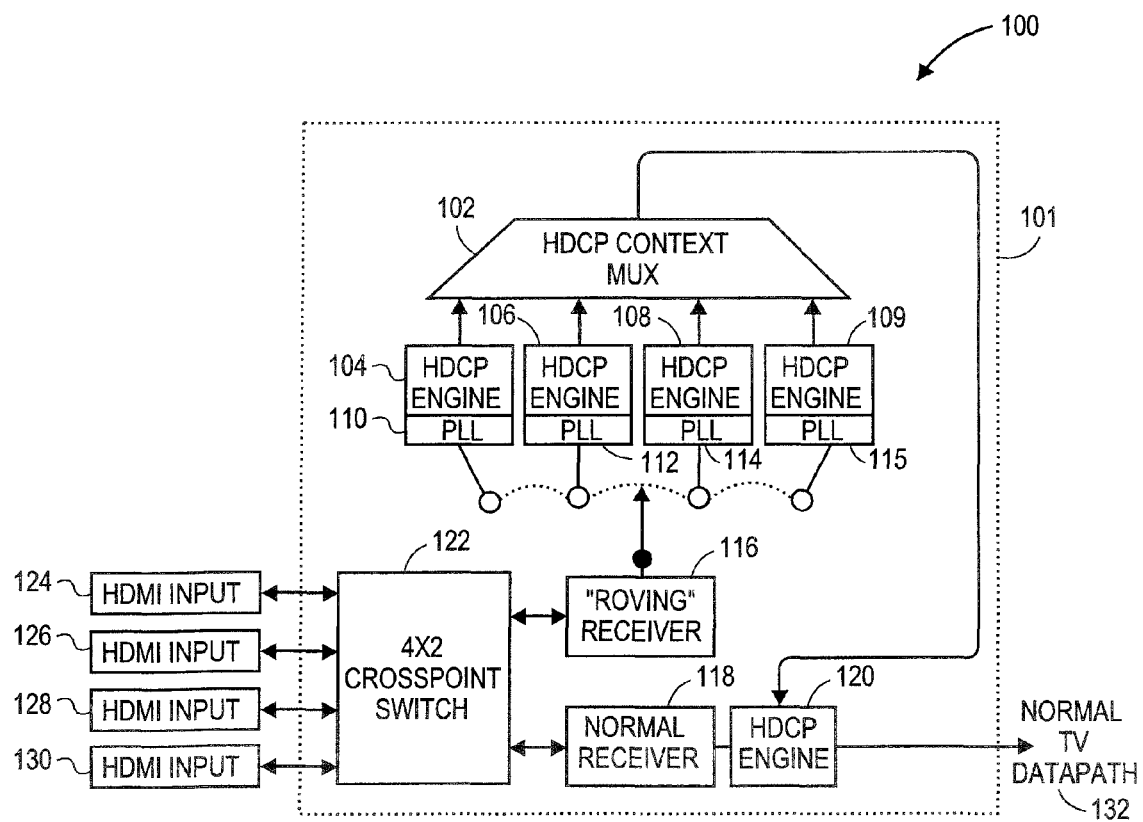
FIG. 1 illustrates a logical block diagram of an HDCP pre-authentication system.

Embodiments of the invention are generally directed to pre-authentication of content protected ports.

As used herein, "network" or "communication network" mean an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as s cable set-top box can serve as a receiver (receiving information from a cable head-end) as well as a transmitter (transmitting information to a TV) and vice versa. In some embodiments, the network devices may be co-located on a single local area network. In other embodiments, the network devices may span multiple network segments, such as through tunneling between local area networks. A network may also include multiple data encoding and encryption processes as well as identify verification processes, such as unique signature verification and unique ID comparison according to one embodiment.

As used herein, "Tx" will be used to generally refer to a transmitting device such as an HDCP transmitting device and "Rx" will be used to generally refer to a receiving device such as an HDCP receiving device.

A time-based roving HDCP architecture uses two pipes: main pipe and roving pipe. The main pipe is dedicated to a port selected by a user to view contents. The roving pipe roves other ports (background ports) one by one in a time-based fashion, keeping those ports authenticated and synchronized with the corresponding Txs. This implementation allows four ports to be supported with two pipes, for example.

A main pipe in a time-based roving HDCP architecture is a pipe dedicated to the port that a user selects to view content (such as movie). The pipe, in general, is composed of analog PLL, SerDes (Serializer and Deserializer) and other logics to recover the AV data from the incoming bit stream.

A roving pipe is the pipe that sequentially roves through the ports that are not connected to the main pipe. The components of the roving pipe are the same as the main pipe.

An HDCP engine includes a logic block that encrypts or decrypts the media contents. Tx has an encryption engine, while Rx has a decryption engine. The HDCP engine takes care of authentication to establish a secure link between Tx and Rx, also keeping track of synchronization between Tx and Rx over the secure link. To check the synchronization, Tx checks Rx with the Ri value at every 128 frames. The Ri value is a residue value of a shared key between Tx and Rx that is updated at every frame.

A CTL3 signal is an indicator whether the current frame includes an encrypted frame or not. Tx sends a CTL3 for each frame it has encrypted to let Rx know that it is an encrypted frame. There are other ways to do this in the HDCP specification, and CTL3 is just an example of a possible signaling for the ease of explanation. For purposes of this application, CTL3 shall be interpreted to mean any encryption synchronization signal including, but not limited to, a CTL3 signal.

An HDCP signal may include the following: VS (Vertical Sync) and CTL3 (encryption indicator) are in the incoming AV stream for synchronization, while authentication and Ri checking are performed through an I2C (DDC) bus.

In one embodiment, a technique of pre-authentication of content protected ports is employed to, for example, eliminate the need to authenticate a media content port each time it is swapped with another port for communicating media content including protected media content.

In content protection schemes, various tools (e.g., revocation lists) are used to detect, verify, and authenticate devices that communicate with each other. These devices include media devices, such a digital versatile disk or digital video disk (DVD) players, compact disk (CD) players, TVs, computers, etc. For example, a transmitting device (e.g., a DVD player) can use such tools to authenticate a receiving device (e.g., TV) to determine whether the receiving device is legal or eligible to receive premium protected media content from the transmitting device. Similarly, the receiving device authenticates the transmitting device prior to accepting the protected media content from it. To avoid too many of such authentication processes (that can be cumbersome, time consuming, and resource wasting), pre-authentication of devices is performed.

"Pre-Authentication" is a term used here to indicate a feature of devices, including HDMI switch products, to allow them to switch more quickly between inputs. The term describes the performance of necessary HDCP authentication before switching to the input, instead of after switching. In this way, the significant delays associated with authentication may be hidden in the background of operation, instead of the foreground.

Since HDCP receivers are considered slave devices, an HDCP receiver is not expected to explicitly signal a transmitter with any request or status. Even a "broken" link is typically signaled implicitly (and rather crudely) by intentionally "breaking" the Ri sequence (the response from Rx to Tx when Tx checks if the link is kept being synchronized securely). There are a wide variety of HDCP transmitters. Many of these HDCP transmitters exhibit unique and quirky behavior that causes much of the delay in media content communication. Embodiments of pre-authorization of media content ports, as described throughout this document, are employed to address such issues and to provide significant value in data stream operations.

In one embodiment, each input (e.g., HDMI input) may have its own HDCP engine that undergoes pre-authentication and then stays synchronized to the source. This means any normal and correct Ri link integrity results are provided to the transmitter so it is ready to properly decrypt if and when the user switches to this input. For example, one of the following three ways may be employed to accomplish this: (1) each link having a complete Transition Minimized Differential Signaling (TMDS) receiver that keeps the corresponding HDCP block synchronized; (2) each link having a partial TMDS receiver that keeps the corresponding HDCP block synchronized; and (3) each link keeping the corresponding HDCP block synchronized in an open-loop fashion without the constant or direct observation of the video link itself.

With regard to HDCP synchronization, in general, an HDCP receiver stay synchronized with the transmitter in the two following ways: (1) the receiver recognizes where the frame boundaries are; and (2) the receiver recognizes which of these frames contains a signal that indicates that a frame is encrypted (e.g., CTL3). Throughout this document, "CTL3" is used as an example of encryption indicator without any limitation for the ease of explanation, brevity, and clarity.

In one embodiment, some of the components of a "pre-authentication" system or apparatus, as described in FIG. 1 and subsequent figures, includes: HDCP engine, Phase Lock Loop (PLL), roving receiver, normal receiver, etc.

In some embodiments, an apparatus contains one dedicated HDCP engine per input port. In general, normal HDCP logic is required in every case, even when the open-loop HDCP engines do not do any decryption. This is because the re-keying functions use the HDCP logic to maximize dispersion.

Each open-loop HDCP engine uses a PLL or PLL-like circuit to lock onto the frame rate and provide ongoing information about where the frame boundaries are while running in the open-loop mode. The PLL could be either an analog or digital PLL. However, a digital PLL is simple and locks quickly, and provides good long term stability.

A single special purpose TMDS receiver is used to sequentially provide the essential information to the open-loop logic. This receiver cycles through the currently unused inputs, finds the frame boundaries (so that the corresponding PLL can lock on), and also finds the first CTL3 signal when an authentication occurs. This could be a stripped-down version of a TMDS receiver because in essence only need the VSYNC and CTL3 indicators are required.

A normal TV data path may work in the same manner as conventional switch products. In operation, one of the input ports is selected for the normal data path, the data stream is decoded and decrypted as necessary, and then is routed through the remainder of the appliance. Further, the roving receiver samples the currently idle ports, one at a time. This employs a state machine or (more likely) a type of microcontroller to control it all.

The initial operation sequence typically follows: (1) the roving receiver is connected to an unused input port and monitors it for video; (2) the HDCP engine is connected to the port as well. This means that the I²C bus is connected. It may also mean signaling Hotplug, to indicate to the source that it should begin its transmission and HDCP authentication. This may also employ the transfer of EDID information, but this is beyond the scope of this disclosure; (3) when video is stable, the roving receiver provides information to align the PLL with the frame boundaries; (4) the state machine or microcontroller waits a time for the HDCP authentication to begin. If it does, it continues to wait until the authentication completes and the first CTL3 signal is received; (5) the HDCP engine continues to cycle in an open-loop fashion, counting "frames" using information only from the PLL. The I²C port stays connected, and the Hotplug signal continues to indicate that a receiver is connected; and (6) and roving receiver then continues on to the next port, and performs the same operations.

In some embodiments, once the roving receiver has started all ports, it then goes into a service loop, checking each port in sequence as follows: (1) the roving receiver re-connects to each active port, one at a time. When it does, it checks to make sure video is still present, and that the frame rate has not changed. If there is a change, the state machine or microcontroller forces re-authentication. This includes intentionally "breaking" the Ri sequence, and/or causing a Hotplug indication, and then going back to the beginning (unconnected) state on this port; (2) if no significant change is detected, then the roving receiver provides frame boundary information to the associated PLL, which re-synchronizes. In some embodiments, if a large error/discrepancy is detected, re-authentication is forced; (3) the state machine also checks with the HDCP block to check if there has been any attempt to re-authenticate while in the open-loop state. If there has been, then this is also a cause for re-authentication; and (4) otherwise, all is assumed the operation is still authenticated, and the roving receiver moves on to the next port.

The foregoing discussion further includes HDCP context switching that relates to a system and procedure for initializing and then and keeping the open-loop HDCP engines synchronized. In some embodiment, a switch is produced to provide for such operations. The HDCP context includes a great deal of state information. There are three "B" registers and three "K" registers of 28-bits each. There's also 60 bits total in the LFSRs (Linear Feedback Shift Registers), 8 bits in the shuffle network, 7 bits in the Ri counter, 56 bits in the Ks register, and 64 in the Mi register. Therefore there are estimated to be 363 bits total context bits that somehow need to be transferred to the active (selected) HDCP engine.

In some embodiments, in order to provide an actual switch that operates smoothly (such that there is no "snow", the Ri sequence is not broken), switching should be done at a frame boundary. This is true both of the HDCP engine a system is switching "into", and the block the system is switching "out of". However, it is very unlikely that both of these will share a frame boundary. In some embodiments, there are two approaches to address this issue: in the first approach a system does not attempt to switch cleanly, or in the second approach a system does not switch the context.

In the first approach, the HDCP engine that is being switched out is allowed to fail, and then is forced to re-authenticate in the background. In the second approach, the entire HDCP engine is switch in/out, and not just the context. In the second approach, this essentially means that there are four identical HDCP engines (for four data paths), each with a PLL, and each permanently associated with an input port. In this manner, when a given input port is selected, that particular HDCP engines is switched into the data path cleanly.

Regarding the process of pro-active re-authentication, in some embodiments, the open-loop techniques describe herein operate as intelligent "guesses" about what the HDCP state should be. These are likely to be very accurate for relatively short periods of time, but increasingly less accurate as the time intervals stretch. In some embodiments, it is desirable to intentionally force occasional re-authentications on the open-loop channels according to a certain time interval. In this way, the open-loop time frames (and thus the risk of undiscovered problems) can be limited. In some embodiments, the time interval could be set or altered within the system's microcontroller, thus allowing experimentation to discover the best tradeoff. The shorter the interval, the more accurate the open-loop state will be. The longer the interval, the less likely the user will switch to this channel while it is being re-authenticated.

In some embodiments, intelligent prioritization is employed wherein a roving receiver may use an intelligent algorithm to choose when and for how long it visits each of the open-loop channels. For example, it can vary the sequence depending on which channels are active or which channels are using HDCP. It can even vary the sequence depending on the user's typical pattern (they might tend to switch in sequence, or ping-pong between two particular inputs, for example). This may be governed by the microcontroller, and thus is can be modified and tailored outside of the silicon product.

FIG. 1 illustrates an embodiment of an HDCP pre-authentication system 100. The illustrated HDCP pre-authentication system 100 includes an HDCP pre-authentication device 101 that include a dedicated HDCP engine block 104-109, 120 per input port. In general, the normal HDCP logic is used in every case, even when the open-loop ciphers do not do any decryption. This is because the re-keying functions use the HDCP logic to maximize dispersion. Further, an open-loop HDCP engine 104-109 is associated with a PLL 110-115 or PLL-like circuit to lock onto the frame rate and provide ongoing information about where the frame boundaries are while running in the open-loop mode.

A single special purpose TMDS receiver 116 (e.g., roving receiver) may be used to sequentially provide the essential information to the open-loop logic. This roving receiver 116 cycles through the currently unused inputs, finds the frame boundaries (so that the corresponding PLL 110-115 can lock on), and also finds the first CTL3 signal when an authentication occurs. In some cases, this could be a stripped-down version of a TMDS receiver 116 because in essence, it merely needs the VSYNC and CTL3 indicators.

Further, a normal TV data path 132 may work in the same manner as conventional switch products. In operation, one of the input ports can be selected for the normal data path 132, while the data stream is decoded and decrypted (e.g., decipher to take out original audio/video (A/V) data from the incoming encrypted data) as necessary, and then is routed through the remainder of the appliance.

The roving receiver 116 samples the currently idle ports, one at a time. This necessitates a state-machine or (more likely) a microcontroller of some kind to control the process. The initial operational sequence typically follows: (1) the roving receiver 116 is connected to an unused input port and monitors it for video; (2) the HDCP engine 104-109 is connected to the port as well, which means that the I$^2$C bus is connected (e.g., I$^2$C is regarded as an additional communication channel between Tx and Rx for link synchronization check). It may also mean signaling hotplug, to indicate to the source that it is ready for getting transmission and the HDCP authentication. This may also facilitate the transfer of Extended Display Identification Data (EDID) information, but this is beyond the scope of this disclosure; (3) when video is stable, the roving receiver 116 provides information to align the PLL with the frame boundaries; (4) the state machine or microcontroller waits a time period for the HDCP authentication to begin. If it does, it continues to wait until the authentication completes and the first CTL3 signal is received; (5) the HDCP block continues to cycle in an open-loop function counting "frames" using information only from the PLL. The I$^2$C port stays connected, and the hotplug signal continues to indicate that a receiver is connected; (6) the roving receiver 116 then continues on to the next port and performs the same operations. In some embodiments, once the roving receiver 116 has started all ports, it then goes into a service loop, checking each port in sequence. In one embodiment, a pre-authentication system 100 having a pre-authentication device 101 employing a pre-authentication architecture (as shown in FIGS. 2-5) may reside in a receiver chip (e.g., switch chip) of a receiver, Rx. Such a receiver can be, for example, used in digital televisions for better and efficient reception of media content.

Figure 2:
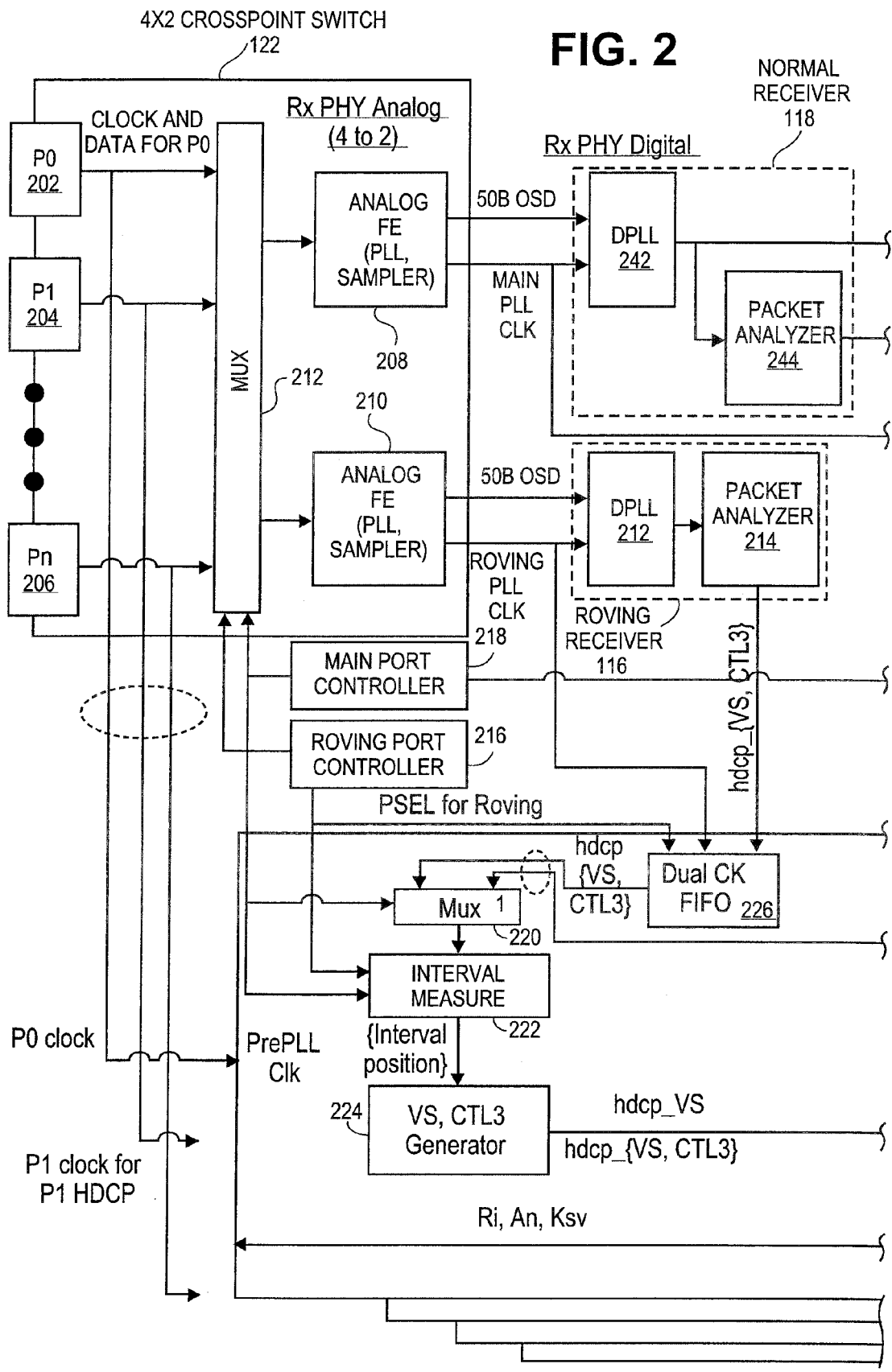
FIG. 2 illustrates an embodiment of a pre-authentication architecture providing a zoom-in of various components of the pre-authentication system of FIG. 1.
Figure 2:
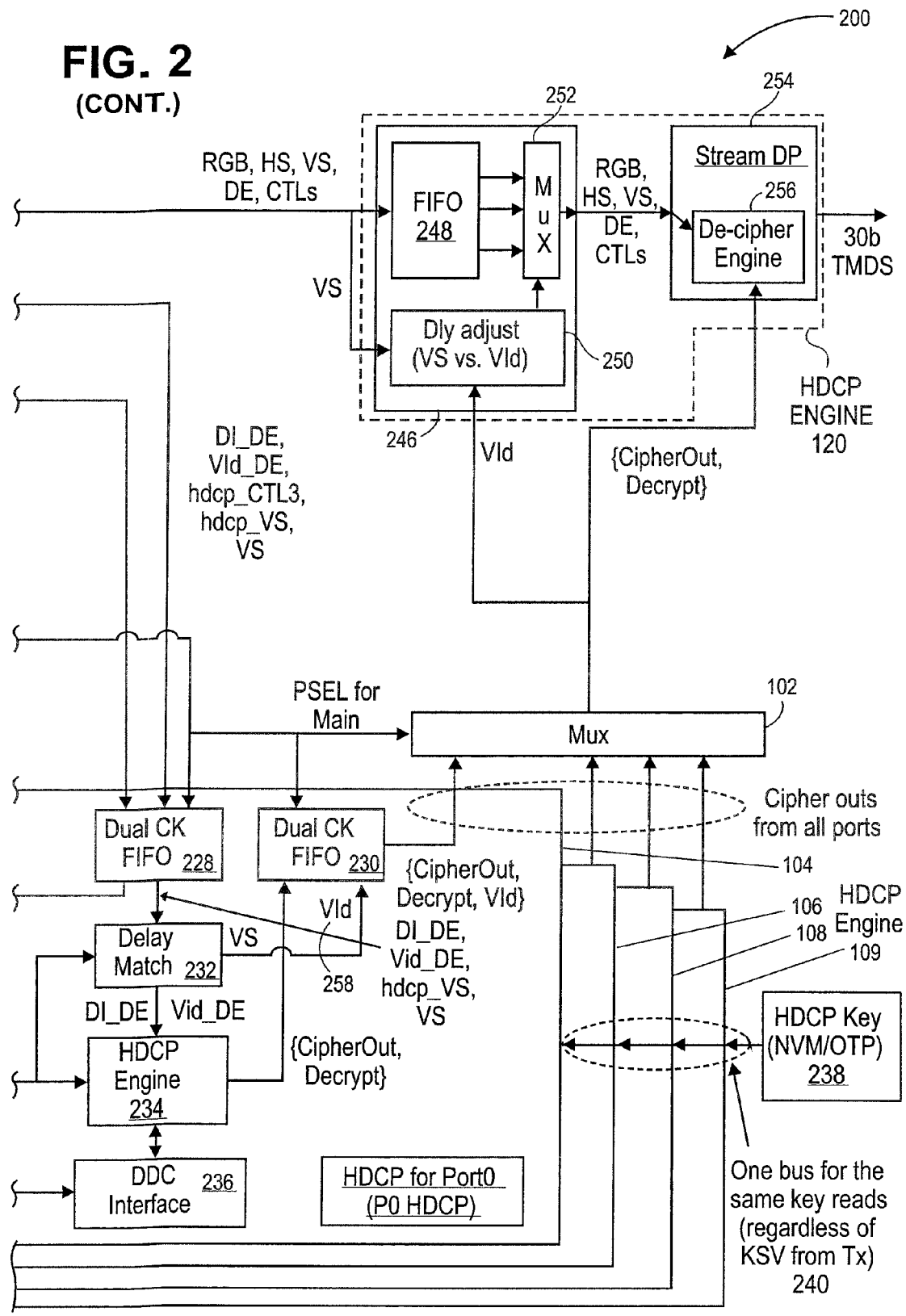

FIG. 2 illustrates an embodiment of a pre-authentication architecture 200 providing a zoom-in of various components of the pre-authentication system 100 of FIG. 1. For example, FIG. 1's crosspoint switch (4×2) 122 is shown has having analog receivers (e.g., Rx PHY analog) 208, 210 that are coupled with a multiplexer 212 further coupled with a number of ports, such as port 0 202, port 1 204 continuing with port n 206 (that correspond to HDMI inputs 124-130 of FIG. 1). The illustrated embodiment further shows normal receiver 118 having DPLL 242 and packet analyzer 244. Similarly, roving receiver 116 is illustrated as comprising DPLL 212 and packet analyzer 214. HDCP engine 120 of FIG. 1 is shown here as having component 246 (including First-In-First-Out (FIFO) 248, Delay adjustment module 250, and multiplexer 252) and stream DP 254 having de-cipher engine 256.

Further, HDCP engines 104-109 are illustrated here being coupled thru HDCP context multiplexer 102. Each HDCP engine having or coupled with various sub-components, such as HDCP engine 104 shown as having or coupled with HDCP key 238 as well as multiplexer 220, interval measure 222, video signal (VS) and CTL3 generator 224, dual CK FIFO 226, dual CK FIFO 228, dual CK FIFO 230, delay match 232, HDCP engine 234, and DDC interface 236. In one embodiment, HDCP engine 104 is represented as HDCP engine 234 coupled with various components 220-238.

The 4×2 cross point switch 122 selects one port for the main pipe or path (that will be seen to the user) and another port for the roving pipe or path (that is in the background). The input stream selected for the main path goes through normal receiver 118 and becomes video and audio data. These data are still HDCP encrypted data. The decryption key of the data comes from one of HDCP engine blocks 104-109 that corresponds to the selected port for the main path. Normal receiver 118 generates signals such as VS and CTL3 that pass through dual CK FIFO 228 (for clock domain crossing), interval measure 222 and VS/CTL3 generator 224. Then, it feeds the HDCP engine 234 that works with DDC interface 236. The HDCP engine 234 generates decryption key. The key passes through multiplexer 102 and reaches component 246 that matches the path delays between encrypted data (coming out from normal receiver 118) and the decryption key (coming from multiplexer 102). The decipher engine in stream DP 254 uses the decryption key to make unencrypted audio and video data, and it goes out through normal TV data path 132 of FIG. 1).

The stream selected for the roving path goes through roving receiver 116 and generates signals such as VS and CTL3 that are needed for keep running the HDCP engines 104-109. The VS and CTL3 signals pass through the similar path as the main path and feed each HDCP engine 104-109 assigned to a selected port. For the roving path, it does not generate any decryption key, but rather works with DDC interface 236 to make an HDCP link synchronized with an HDCP Tx source.

Figure 3:
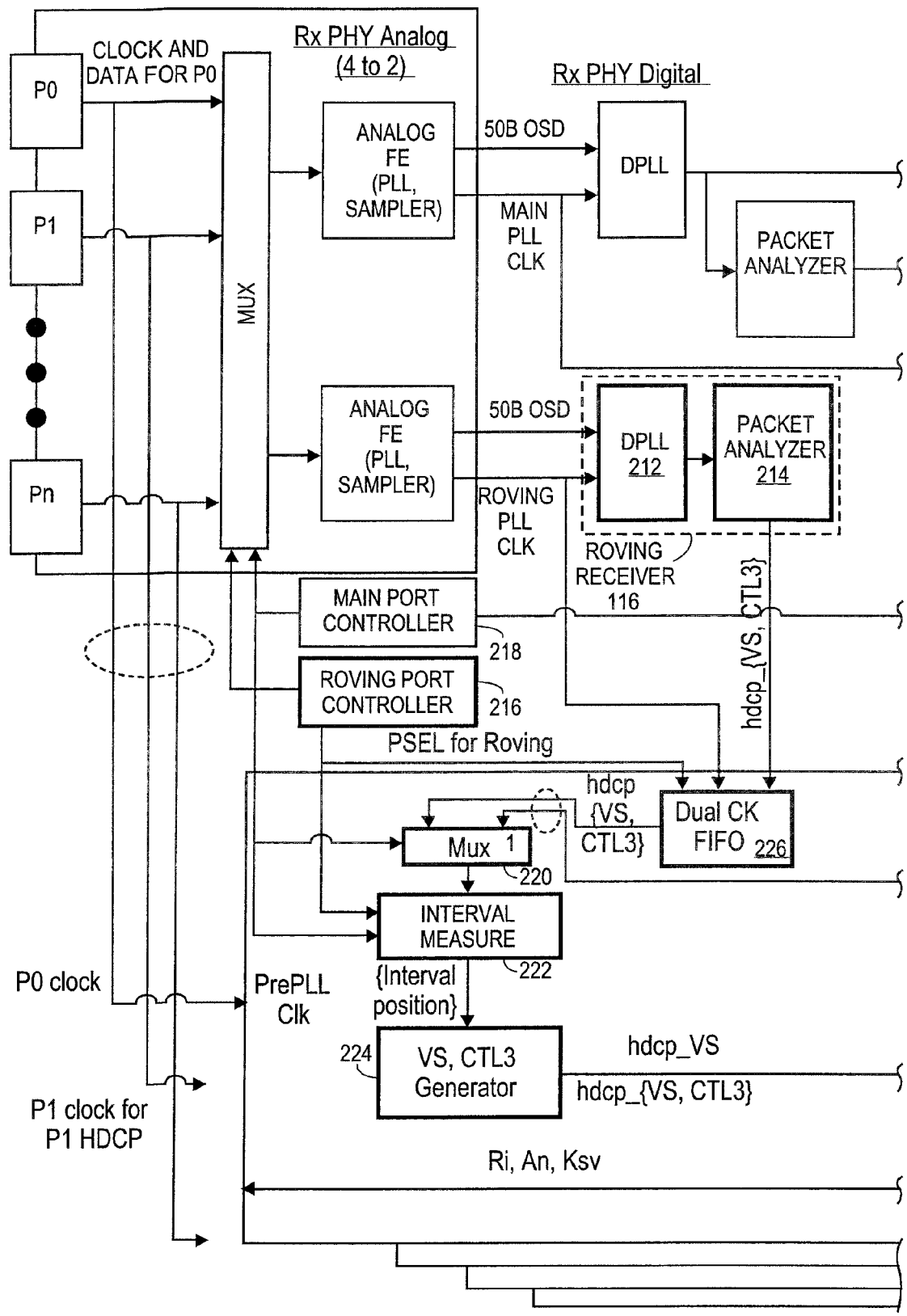
FIG. 3 illustrates an embodiment of roving details in an embodiment of a pre-authentication architecture.
Figure 4:
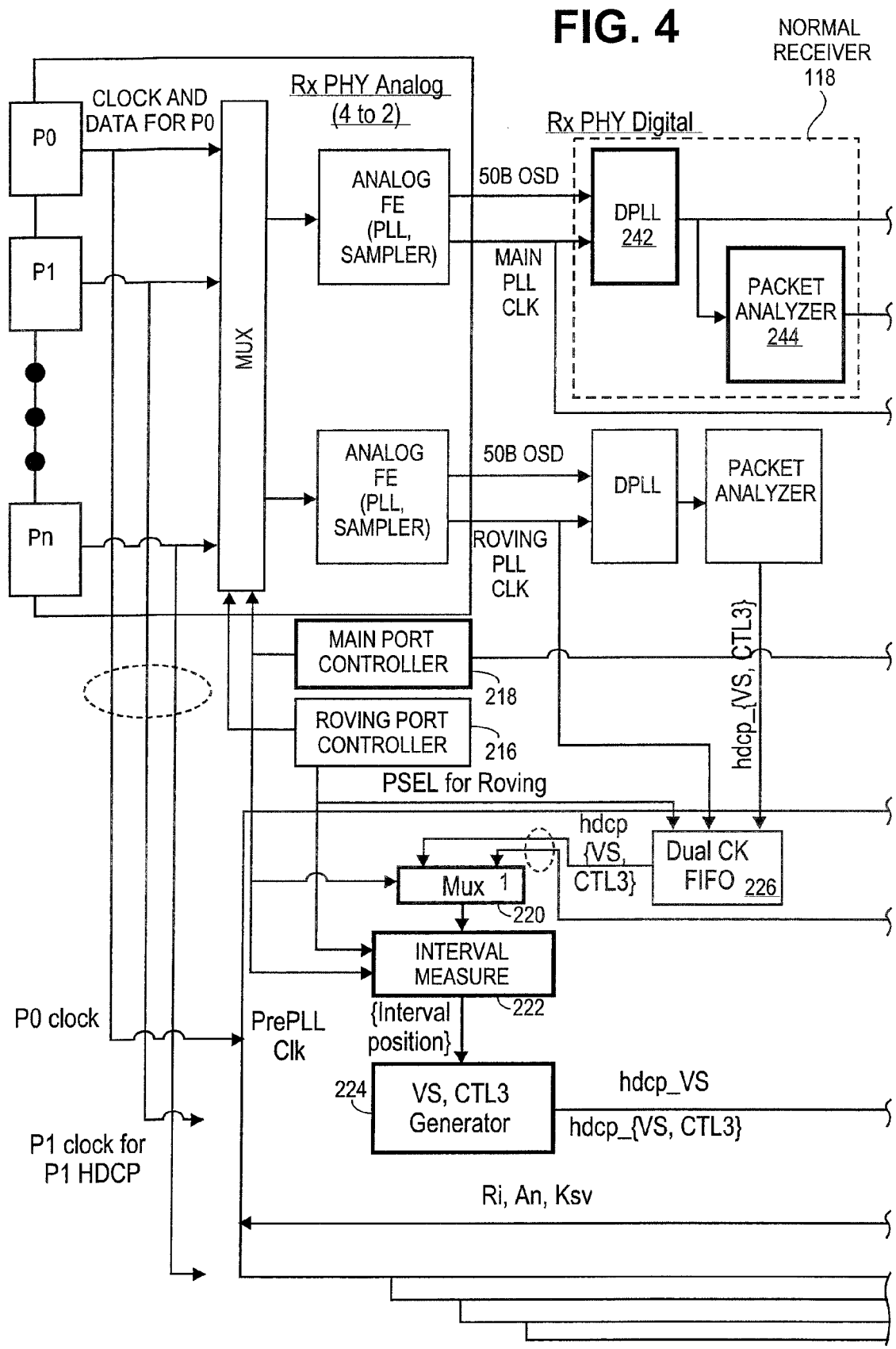
FIG. 4 illustrates an embodiment of generating cipher out details in an embodiment of a pre-authentication architecture.
Figure 4:
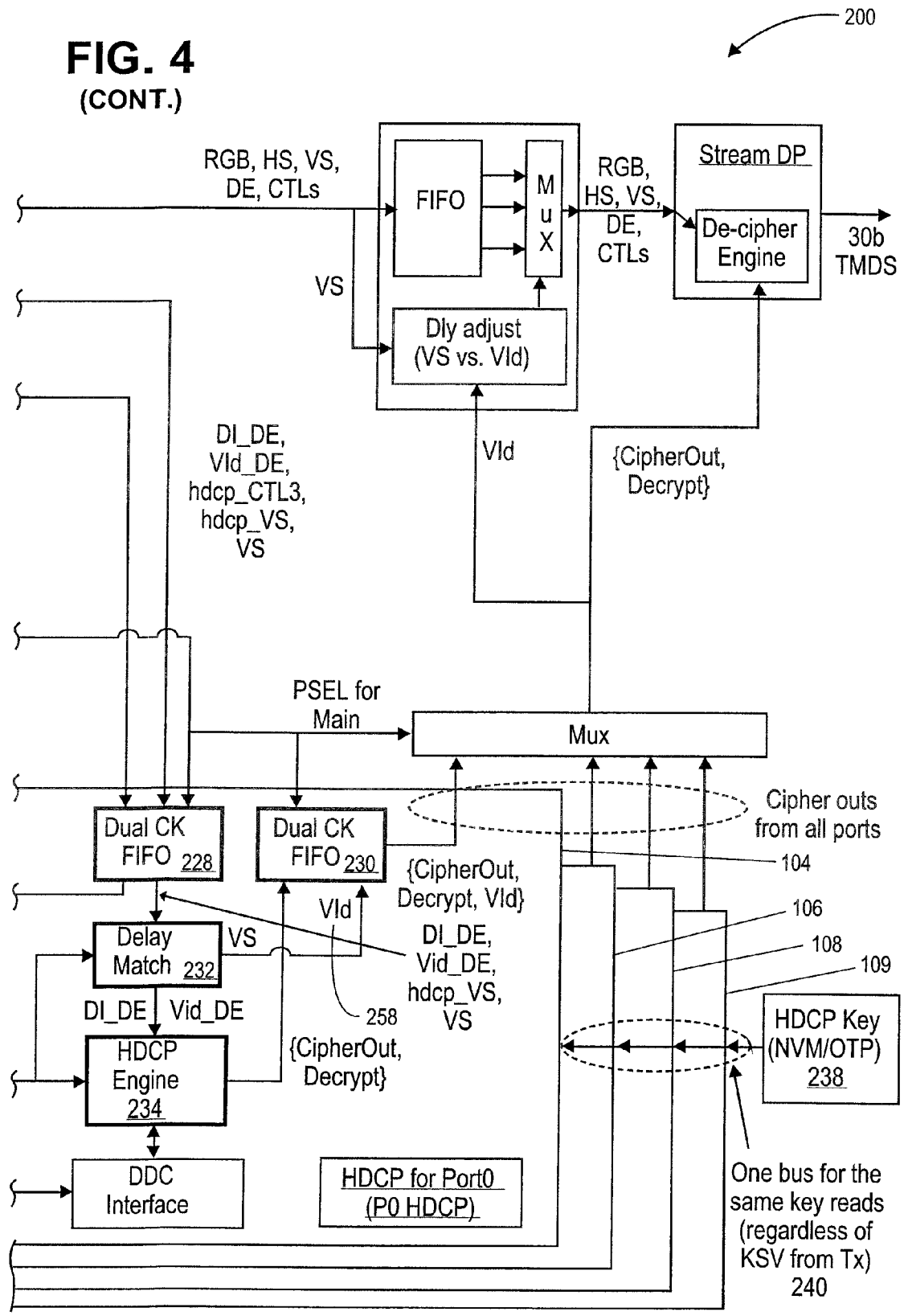
Figure 5:
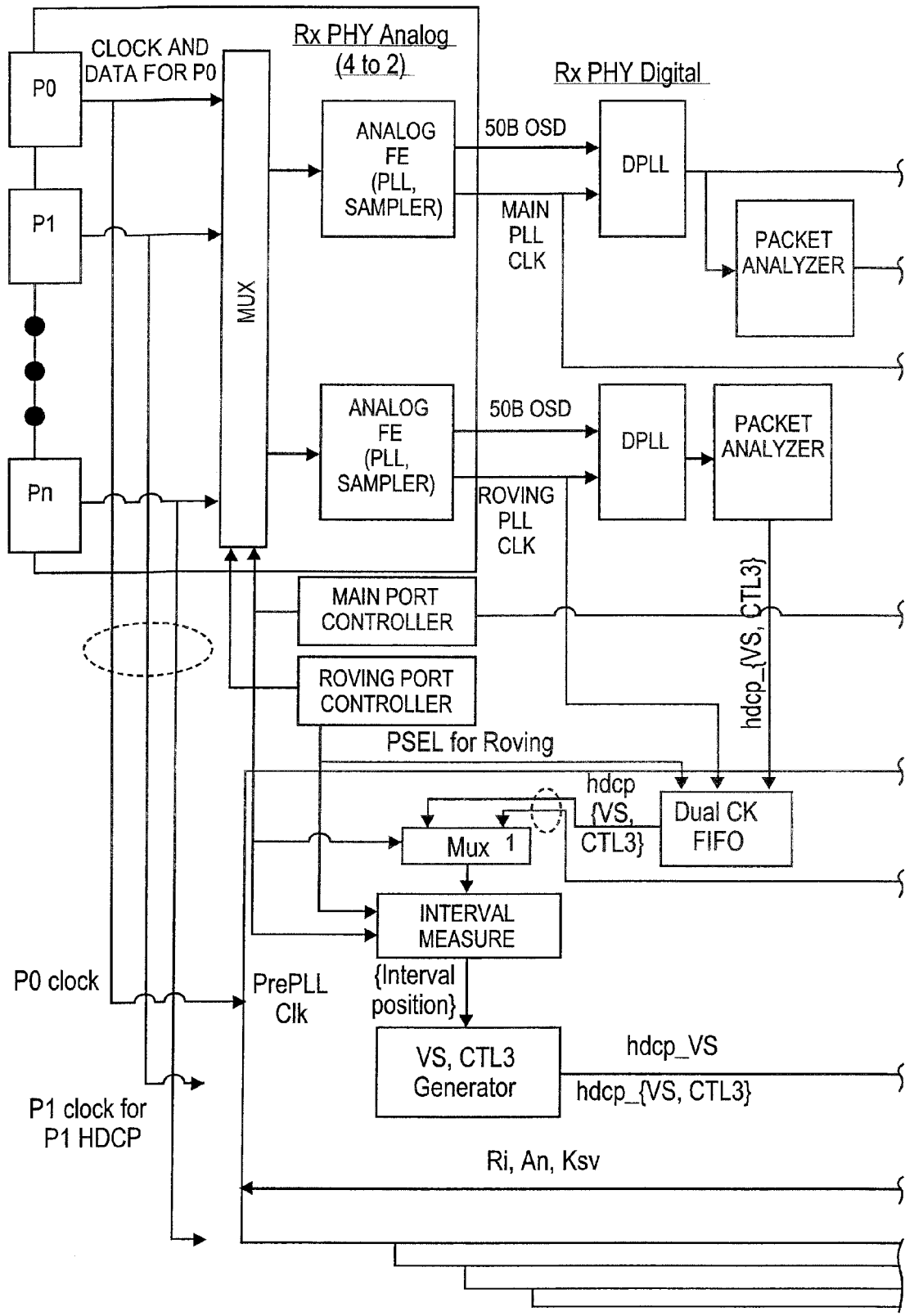
FIG. 5 illustrates an embodiment of main pipe decipher details in an embodiment of a pre-authentication architecture.
Figure 5:
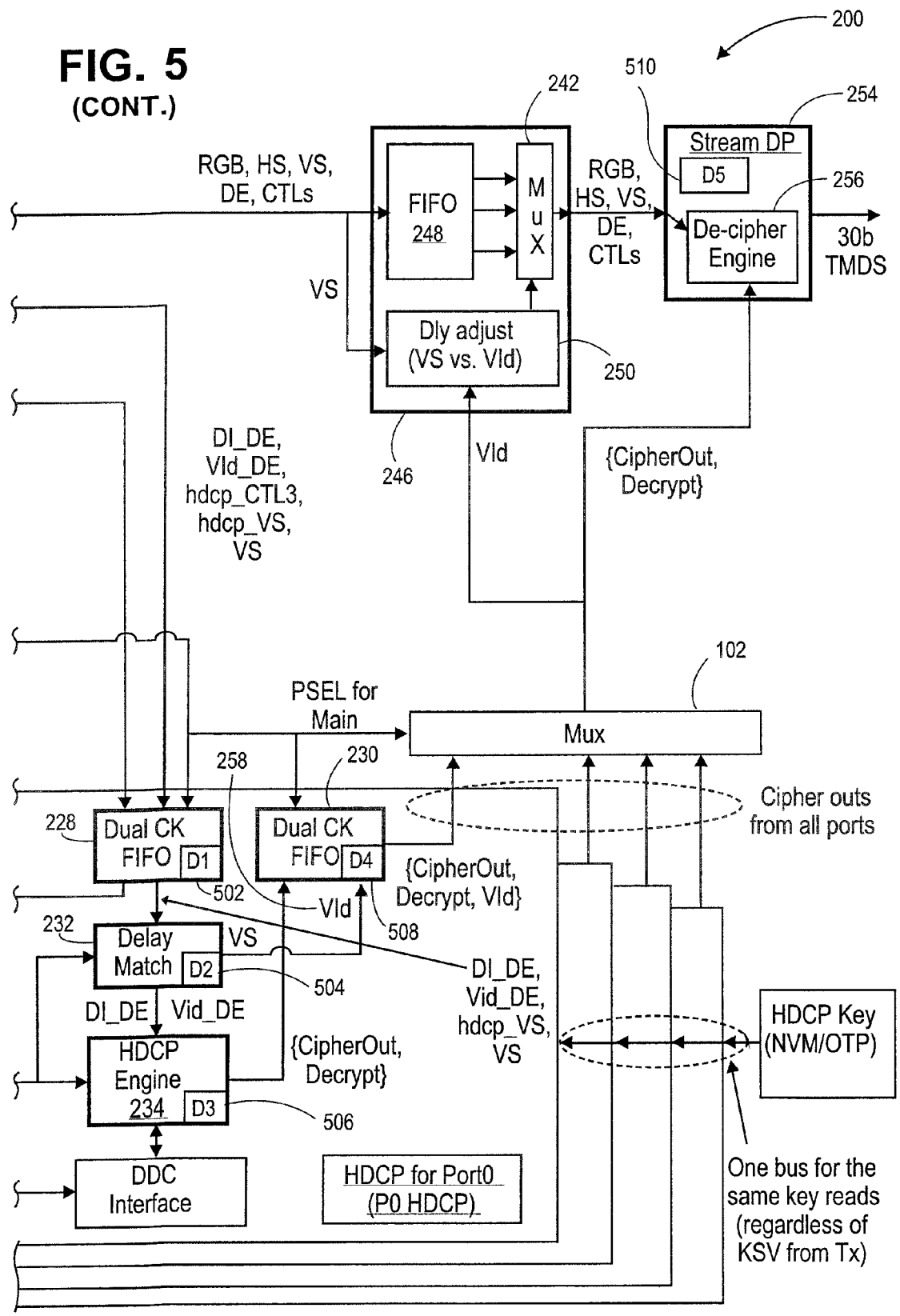

In one embodiment, pre-authentication architecture 200 is employed to perform pre-authentication of ports such that each port is pre-authorized to communicate protected media content that eliminates the conventional necessity to authenticate a port each time it is swapped with another port. FIGS. 3-5 further describe various components of pre-authentication architecture 200.

FIG. 3 illustrates an embodiment of roving details in an embodiment of a pre-authentication architecture 200. In one embodiment, roving port controller 216 having roving control logic is employed. Roving port controller 216 operates using an oscillator clock since it has to work even if there is no link clock (e.g., video clock). It selects one roving port and then the other with or without a "no selection period" that might be used for a reset operation of FIFO 226. Multiplexer 220 is used to select data from FIFO 226. In the absence of a "not selection period", FIFO 226 generates its own reset pulse. Since roving port controller 216 uses an oscillator clock, it may not be synchronized to a video signal or any other video signals and may start at anytime for a fixed time period.

With regard to VS/CTL3 generator 224, if a video signal position is skewed more than "m" cycles, it is regarded as a new video signal and not the one that is being tracked and thus, VS/CTL3 generator 224 is initialized using the position information; otherwise, the position is not changed. In that case, merely intervals may be used. Further, this path is slower than the one through FIFO 228, thus delay match 232 is used to match the path delay. Interval measure module 222 measures high time and low time of an HDCP video signal. For CTL3, interval measure 222 checks to determine whether there is a valid length of CTL3 and if there is, it generates CTL3 going to HDCP engine 234; otherwise, CTL3 is set to zero and thus, without any HDCP signal and any decryption is also null. Further, interval measure 222 measures PSEL (associated with a roving pipe) or PSEL (associated with the main pipe) is set to 1. Not merely interval, but also the position is forwarded to generator 224 to determine when to start the generation of a video signal and to detect whether the video signal is the same as the one that is being tracked. Any glitches caused during the selection change is filtered out by ignoring or detecting video signals or CTL3's that are too close/narrow. Packet analyzer 214 generates positive logic signals by analyzing input packets having video signals and deciding the polarity of the video signals and, if necessary, regenerating the video signals with positive polarity. Similarly, packet analyzer 214 generates CTL3's that are the same as those used for HDCP engines 234.

HDCP engine 234 represents the core of HDCP engine 104. An HDCP engine 234 is either assigned to a main pipe or the roving pipes and performs its functions according to the assignment using the input signals from VS/CTL3 generator 224. It performs HDCP authentication through DDC Interface 236 to keep the link authenticated and decryption key generation for the main pipe. HDCP engines 104-109 are coupled through a single bus 240 to share HDCP key 238 among the HDCP engines 104-109.

FIG. 4 illustrates an embodiment of generating cipher out details in an embodiment of a pre-authentication architecture 200. In one embodiment, moving port controller 218 operates using an oscillator clock since it has to work even if there is no link clock. It selects one port per user input with or without a "no selection period" that might be used for a reset operation of FIFO 228 and 230. Multiplexer 220 selects data from FIFO 228 and enables the main pipe to fully control the port HDCP and further enables normal receiver 118 to handle authentication-related change in the main path. In the absence of a "not selection period", one of FIFO 228 and 230 generates its own reset pulse. Since roving port controller 216 uses an oscillator clock, it may not be synchronized to a video signal or any other video signals and may start at anytime for a fixed time period. Packet analyzer 244 of normal receiver 118 receives a video signal output directly from DPLL without any additional delay.

In one embodiment, regarding FIFO 228 and 230, PSEL (for the main pipe and the port associated with the main pipe) is used to reset a content signal. This reduces the latency different of VS read out at the output of FIFO 228, 230 at prePLL clock domain, which may be decided each time FIFO 228, 230 starts to run per the relationship of two clocks.

Delay match module 232 matches two path delays that go through FIFO 228 (while one going through interval measure 222 and VS/CTL3 generator 224 and the other going directly to delay match 232). For example, this makes signals such as Data Island DE (DI_DE) and Video DE (Vid_DE) from the main path/pipe are positioned correctly to the position of an HDCP signal (e.g., hdcp_VS). The delay matched signals go into HDCP engine 234 to generate correct decryption key value (CipherOut) for the main pipe.

Any glitches associated with multiplexer 220 are avoided by filtering out the problematic selection of content, such as a video signal that is too narrow. A set of valid video signals (e.g., DI_DE, Vid_DE) coming through the main pipe arrive at an HDCP engine 234 after alignment to the video signals is performed by delay match 232. Further, for example, a 24b CipherOut is generated and decrypted when it is ready to decipher.

FIG. 5 illustrates an embodiment of main pipe decipher details in an embodiment of a pre-authentication architecture 200. In one embodiment, delay is added to the main path/pipe to make the media content and CipherOut arrive simultaneously at decipher engine 256. Along with a video signal and Vld 258, the delay D5 510 at decipher engine 256 is also considered. The delayed matched CipherOut and encrypted data are used to generate unencrypted raw data.

Figure 6:
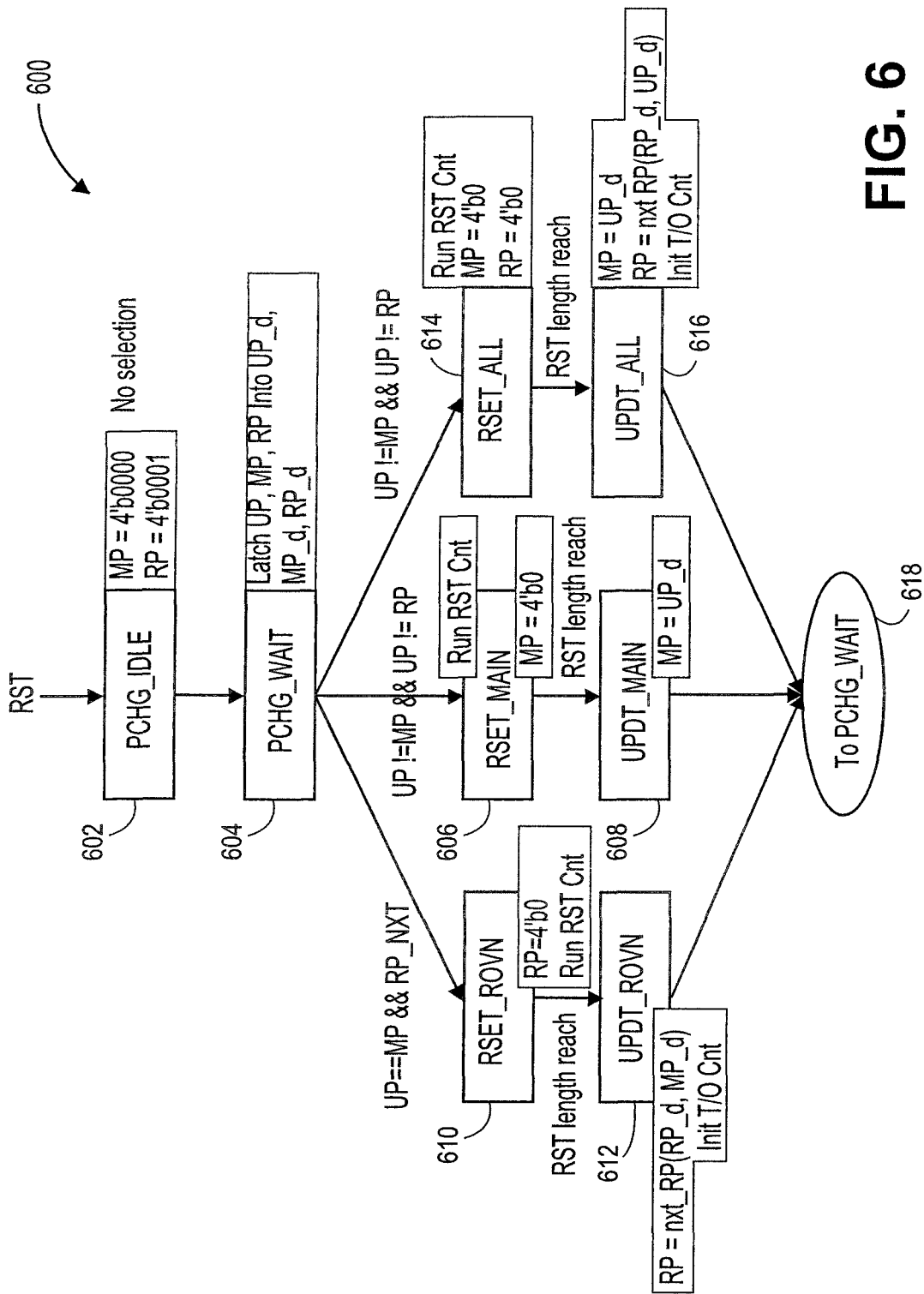
FIG. 6 illustrates an embodiment of a sequence for port changing associated with both the main and roving pipes.

FIG. 6 illustrates an embodiment of a sequence 600 for port changing associated with both the main and roving pipes. The illustrated embodiment of the sequence 600 illustrates port changing in idle mode 602 and then, in wait mode 604. If the main port associated with main pipe is selected, the main port is reset 606 and then updated 608, as necessary. Similarly, if a roving port associated with the roving pipe is selected, the roving port is reset 610 and then, it is updated 612. If needed or requested, all ports are reset 614 and then updated 616. Once the requested or necessary processes are performed, the port changing returns to the wait mode 618. Since each port is pre-authenticated, in one embodiment, each port is ready to be swapped with any of the other ports.

In port change, we check user port selection (UP), main port selection (MP), and roving port selection (RP) to decide which part is to be reset and updated. If UP is different from MP and also different from RP, then that means just changing the main port to the port selected by the user. First, reset the main pipe 606 and then update the MP with UP 608. On the other hand, if user does not change the port (e.g., UP is equal to MP) but roving needs to move to the next port, it passes through 610 and 612. If the user changes the port and the selected port is already connected to the roving pipe, then the main pipe and the roving pipe are rest first 614 and then both pipes are updated without any port selection collision 616.

Figure 7:
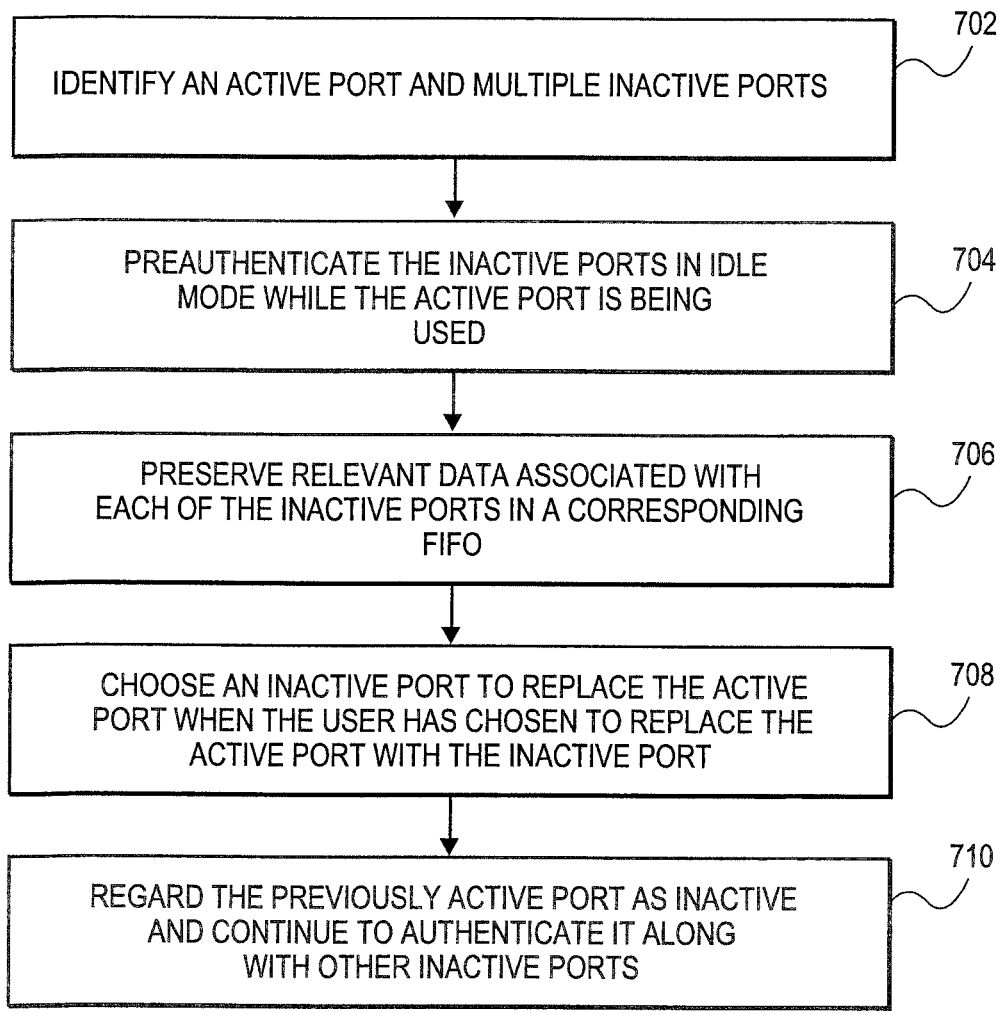
FIG. 7 illustrates an embodiment of a process for authenticating media content ports.

FIG. 7 illustrates an embodiment of a process for authenticating media content ports. At processing block 702, various media content ports for carrying protected media content are identified as active or inactive. An active port is a chosen port that is in work mode and actively carries the protected media content between a transmitter and a receiver (e.g., HDCP transmitter, HDCP receiver). To be sure the content is communicated between authorized transmitter and receiver, the devices and the ports associated with them are to be authenticated before they can transmit or receive the content. While the active port regarded as main port is busy communicating the data, the inactive ports regarded as roving ports are surveyed and pre-authenticated at processing block 704. In one embodiment, the pre-authentication process is used to pre-authenticate the inactive ports so if an inactive port is selected by a user to replace the active port, the change can be done without the additional delay from having to authenticate the inactive port.

At processing block 706, any relevant data relating to the inactive ports collected during the pre-authentication process is preserved and used to keep the inactive ports being authenticated. This makes HDCP engine kept alive, synchronized to the source, and be ready for the change to main pipe. At processing block 708, an inactive port is selected by a user to replace the active port and the swap is performed. At processing block 710, the previously active/main port is now regarded as inactive/roving and is now pre-authenticated along with other inactive ports to be prepared in case subsequently chosen to be the active port again.

Figure 8:
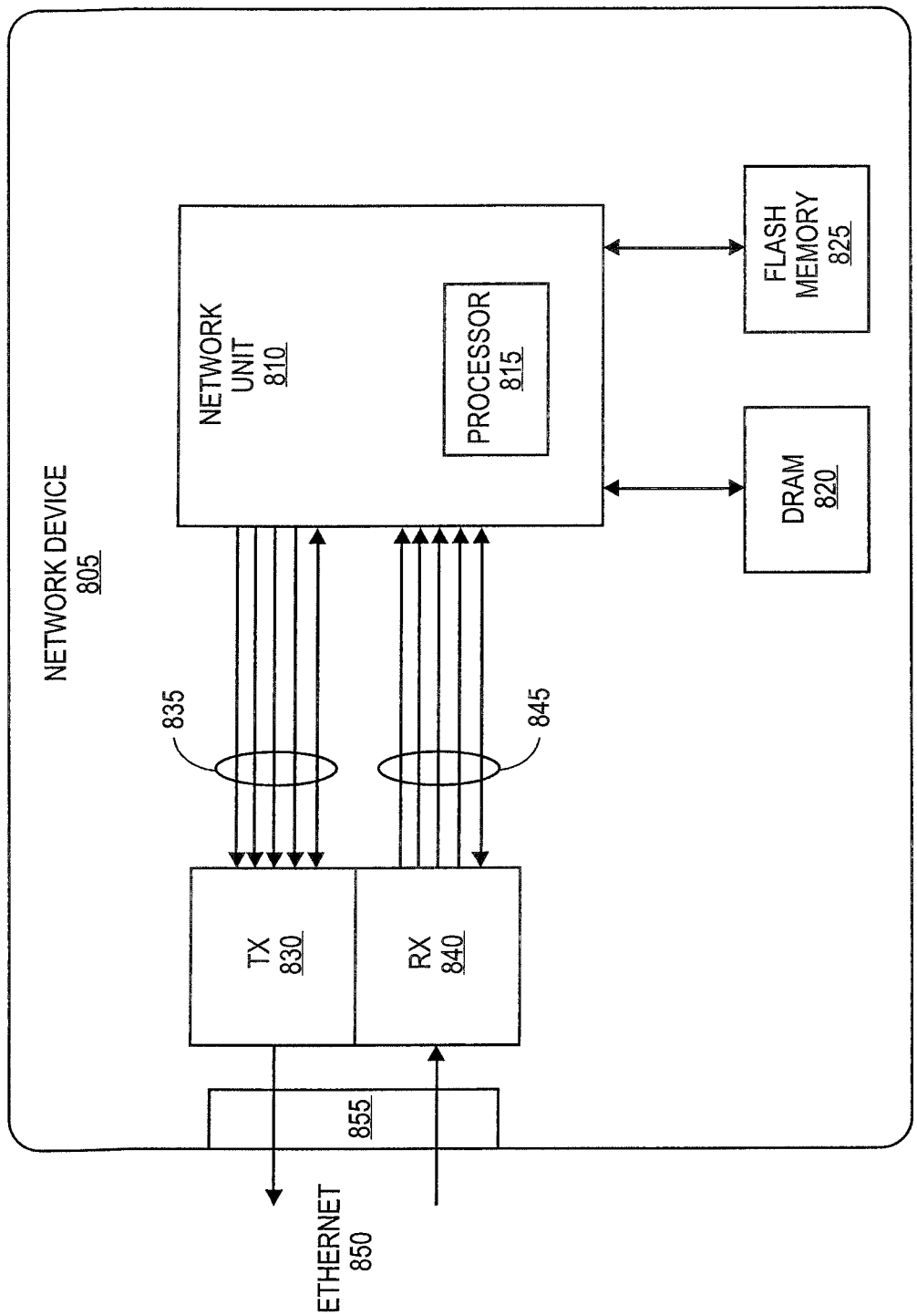
FIG. 8 is an illustration of embodiments of components of a network computer device employing an embodiment of the present invention.

FIG. 8 is an illustration of embodiments of components of a network computer device 805 employing an embodiment of the present invention. In this illustration, a network device 805 may be any device in a network, including, but not limited to, a television, a cable set-top box, a radio, a DVD player, a CD player, a smart phone, a storage unit, a game console, or other media device. In some embodiments, the network device 805 includes a network unit 810 to provide network functions. The network functions include, but are not limited to, the generation, transfer, storage, and reception of media content streams. The network unit 810 may be implemented as a single system on a chip (SoC) or as multiple components.

In some embodiments, the network unit 810 includes a processor for the processing of data. The processing of data may include the generation of media data streams, the manipulation of media data streams in transfer or storage, and the decrypting and decoding of media data streams for usage. The network device may also include memory to support network operations, such as DRAM (dynamic random access memory) 820 or other similar memory and flash memory 825 or other nonvolatile memory.

The network device 805 may also include a transmitter 830 and/or a receiver 840 for transmission of data on the network or the reception of data from the network, respectively, via one or more network interfaces 855. The transmitter 830 or receiver 840 may be connected to a wired transmission cable, including, for example, an Ethernet cable 850, a coaxial cable, or to a wireless unit. The transmitter 830 or receiver 840 may be coupled with one or more lines, such as lines 835 for data transmission and lines 845 for data reception, to the network unit 810 for data transfer and control signals. Additional connections may also be present. The network device 805 also may include numerous components for media operation of the device, which are not illustrated here.

In one embodiment, a pre-authentication system 100 having a pre-authentication device 101 (of FIG. 1) employing a pre-authentication architecture (as shown in FIGS. 2-5) may reside in a receiver chip (e.g., switch chip) of a receiver 840. Such a receiver 840 can be, for example, used in digital televisions for better and efficient reception of media content.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

One or more modules, components, or elements described throughout this document, such as the ones shown within or associated with an embodiment of a port multiplier enhancement mechanism may include hardware, software, and/or a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically EPROM (EEPROM), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computer-implemented method comprising:
identifying, at a computing device, a main port serving as an active port facilitating communication of media content between a transmitting device and a receiving device, the main port associated with a main pipe and a first High-Definition Content Protection (HDCP) engine at the computing device;

identifying, at the computing device, roving ports as inactive ports in idle mode serving as backup ports to the active port, the roving ports associated with roving pipes and a second HDCP engine, wherein the first and second HDCP engines are synchronized to the transmitting device;

pre-authenticating, at the computing device, the identified roving ports, wherein pre-authentication of the identified roving ports is performed simultaneously while the roving ports remain inactive and the main port serves as the active port, wherein data relating to the roving ports collected during pre-authentication process is stored and used in order to keep the roving ports authenticated to ensure that any of the roving ports is ready to replace the main port to serve as the active port; and in response to a port switch, on-demand and seamlessly, replacing the main port with a pre-authenticated roving port to serve as the main and active port.

2. The computer-implemented method of claim 1, wherein pre-authenticating comprises preparing each of the inactive ports such that each inactive port is capable of facilitating communication of the media content between the transmitting device and the receiving device.

3. The computer-implemented method of claim 1, wherein the port switch comprises selecting an inactive port to replace the active port to facilitate communication of the media content between the transmitting device and the receiving device.

4. The computer-implemented method of claim 1, further comprising generating state information for each of the inactive ports, and storing the state information in memory pipes corresponding to the inactive ports.

5. The computer-implemented method of claim 1, further comprising synchronizing the inactive ports by the second HDCP engine via time multiplexing, wherein synchronizing includes Ri synchronizing or vertical re-keying of the inactive ports.

6. The computer-implemented method of claim 1, further comprising selecting one of the inactive ports to replace the active port to continue to facilitate the communication of the media content between the transmitting device and the receiving device.

7. The computer-implemented method of claim 6, further comprising after the port switch is completed, reclassifying the active device as inactive device, and keep authenticating the newly reclassified inactive device.

8. An apparatus comprising:
a transmitting device communicating media content with a receiving device at a computing device; and
the receiving device employing a pre-authentication mechanism, the pre-authentication mechanism to:
identify a main port serving as an active port facilitating the communication of the media content between the transmitting device and the receiving device, the main port associated with a main pipe and a first High-Definition Content Protection (HDCP) engine;
identify roving ports serving as inactive ports in idle mode serving as backup ports to the active port, the roving ports associated with roving pipes and a second HDCP engine, wherein the first and second HDCP engines are synchronized to the transmitting device;
pre-authenticate the identified inactive ports, wherein pre-authentication of the identified roving ports is performed simultaneously while the roving ports remain inactive and the main port serves as the active port, wherein data relating to the roving ports collected during pre-authentication process is stored and used in order to keep the roving ports authenticated to ensure that any of the roving ports is ready to replace the main port to serve as the active port; and in response to a port switch, on-demand and seamlessly, replacing the main port with a pre-authenticated roving port to serve as the main and active port.

9. The apparatus of claim 8, wherein the pre-authentication mechanism is further modified to prepare each of the inactive ports such that each inactive port is capable of facilitating communication of the media content between the transmitting device and the receiving device.

10. The apparatus of claim 8, wherein the port switch comprises selecting an inactive port to replace the active port to facilitate communication of the media content between the transmitting device and the receiving device.

11. The apparatus of claim 8, wherein the pre-authentication mechanism is further modified to generate state information for each of the inactive ports, and storing the state information in memory pipes corresponding to the inactive ports.

12. The apparatus of claim 8, wherein the pre-authentication mechanism is further modified to synchronize the inactive ports by the second HDCP engine via time multiplexing, wherein synchronizing includes Ri synchronizing or vertical re-keying of the inactive ports.

13. The apparatus of claim 8, wherein the pre-authentication mechanism is further modified to select one of the inactive ports to replace the active port to continue to facilitate the communication of the media content between the transmitting device and the receiving device.

14. The apparatus of claim 13, wherein the pre-authentication mechanism is further modified to after the port switch is completed, reclassify the active device as inactive device, and re-authenticate the newly reclassified inactive device.

15. A computing system for port pre-authentication comprising: a pre-authentication device to pre-authenticate media content ports to facilitate a seamless communication of media content between a transmitting device and a receiving device, the ports including an active port and inactive ports, the pre-authentication device to:
identify a main port serving as the active port facilitating communication of the media content between the transmitting device and the receiving device, the main port associated with a main pipe and a first High-Definition Content Protection (HDCP) engine;
identify roving ports serving as the inactive ports in idle mode serving as backup ports to the active port, the roving ports associated with roving pipes and a second HDCP engine, wherein the first and second HDCP engines are synchronized to the transmitting device;
pre-authenticate the identified inactive ports, wherein pre-authentication of the identified roving ports is performed simultaneously while the roving ports remain inactive and the main port serves as the active port, wherein data relating to the roving ports collected during pre-authentication process is stored and used in order to keep the roving ports authenticated to ensure that any of the roving ports is ready to replace the main port to serve as the active port; and
in response to a port switch, on-demand and seamlessly, replacing the main port with a pre-authenticated roving port to serve as the main and active port.

16. The computing system of claim 15, wherein the pre-authentication device is further modified to prepare each of the inactive ports such that each inactive port is capable of facilitating communication of the media content between the transmitting device and the receiving device.

17. The computing system of claim 15, wherein the port switch comprises selecting an inactive port to replace the active port to facilitate communication of the media content between the transmitting device and the receiving device.

18. The computing system of claim 15, wherein the pre-authentication device is further modified to generate state information for each of the inactive ports, and storing the state information in memory pipes corresponding to the inactive ports.

19. The computing system of claim 15, wherein the pre-authentication device is further modified to synchronize the inactive ports by the second HDCP engine via time multiplexing, wherein synchronizing includes Ri synchronizing or vertical re-keying of the inactive ports.

20. The computing system of claim 15, wherein the pre-authentication device is further modified to select one of the inactive ports to replace the active port to continue to facilitate the communication of the media content between the transmitting device and the receiving device.

* * * * *